United States Patent [19]
Pratt

[11] Patent Number: 4,582,143
[45] Date of Patent: Apr. 15, 1986

[54] FORWARDLY-FOLDING AGRICULTURAL IMPLEMENT

[75] Inventor: Ronald L. Pratt, Moline, Ill.

[73] Assignee: Deere & Company, Moline, Ill.

[21] Appl. No.: 566,096

[22] Filed: Dec. 27, 1983

[51] Int. Cl.⁴ .................... A01B 73/00; A01B 49/00; A01B 59/00; B62D 21/14
[52] U.S. Cl. .................... 172/311; 172/327; 172/776; 280/411 A
[58] Field of Search ............. 172/311, 395, 413, 416, 172/417, 418, 419, 421, 326, 327, 780, 781, 799.5, 310; 280/411 A, 411 R, 656

[56] References Cited

U.S. PATENT DOCUMENTS

| | | | |
|---|---|---|---|
| 3,081,567 | 3/1963 | Saul | 172/780 X |
| 4,136,743 | 1/1979 | van der Lely | 172/311 X |
| 4,319,643 | 3/1982 | Carter et al. | 172/311 |
| 4,337,832 | 7/1982 | Whitlow | 172/780 X |
| 4,364,581 | 12/1982 | Shoup | 280/411 A |
| 4,504,076 | 3/1985 | Bedney | 172/311 X |

FOREIGN PATENT DOCUMENTS

| | | | |
|---|---|---|---|
| 840730 | 5/1970 | Canada | 172/311 |
| 241298 | 8/1969 | U.S.S.R. | 172/780 |

*Primary Examiner*—Richard J. Johnson
*Assistant Examiner*—Terrence L. B. Brown
*Attorney, Agent, or Firm*—Henderson & Sturm

[57] ABSTRACT

A forwardly-folding, tractor-drawn agricultural implement featuring a rear center frame and a pair of wing sections that may selectively occupy operating positions in which they are horizontally and transversely alined with each other but alined in that manner forwardly of the center, rear section. This rear section carries no agricultural tools and serves basically as a rear rolling support for the implement in both its operating position and in a transport position in which the wing sections are folded forwardly along opposite sides of a central telescopic tongue or hitch by means of which the rear section is connected to and supported on a tractor. When the implement is in its transport or folded position, the overall length of the machine may be shortened to bring the rear support wheels closer to the tractor.

1 Claim, 3 Drawing Figures

4,582,143

FORWARDLY-FOLDING AGRICULTURAL IMPLEMENT

BACKGROUND OF THE INVENTION

Forwardly-folding agricultural implements ae relatively widely known as one species of a class of implements that are relatively wide during operation but whose width is decreased for transport by means of folding side or wing sections rearwardly, upwardly or forwardly. The various advantages and disadvantages of each type have been discussed at length in previous patented art and need not be elaborated here. Assignee's U.S. Pat. No. 4,137,852 to Pratt, develops at length one form of forwardly-folding machine. The present invention is an improvement on the Pratt patent.

The Pratt patent discloses what may be termed a three-section machine in which each of the three sections carries agricultural tools, such as planting units for example although the tool bars or sections characteristic of wide implements are not limited to only planting units. In this three-section implement, the three sections, when in operating or field-planting position are transversely alined, end-to-end. The center section is connected to and supported on the drawbar of a tractor by means including a telescopic tongue which is capable of extending as an incident to the forward folding of the wing sections respectively about vertical pivots on the rear section. The wing sections are wheel-supported and relatively easily moved between their transport and folded positions, a characteristic not unknown to rearwardly-folding implements.

According to the present invention, the center section is provided as a wheeled support and does not carry row units or other tools like the wing sections. The wing sections are aligned forwardly of the center section in operating mode; that is to say, there is no center section to intervene between the wing sections. Again a telescopic hitch connection is used to effect folding and unfolding of the implement. An added feature in the present case, however, is that that portion of the rear section, which may include part of the hitch, is selectively variable in length, being rearwardly extendible in the working position of the implement and forwardly shiftable in the folded position of the implement. In other words, when the telescopic hitch is extended in the transport mode, the rear section is moved forwardly to compensate for the increased length of the hitch and achieves a shorter "wheelbase" during transport and improves stability and mobility of the tractor-implement train.

Further features and objects will appear as a preferred embodiment of the invention is disclosed in detail in the following specification and accompanying drawings.

DETAILED DESCRIPTION OF A PREFERRED EMBODIMENT OF THE INVENTION

Figure 1:
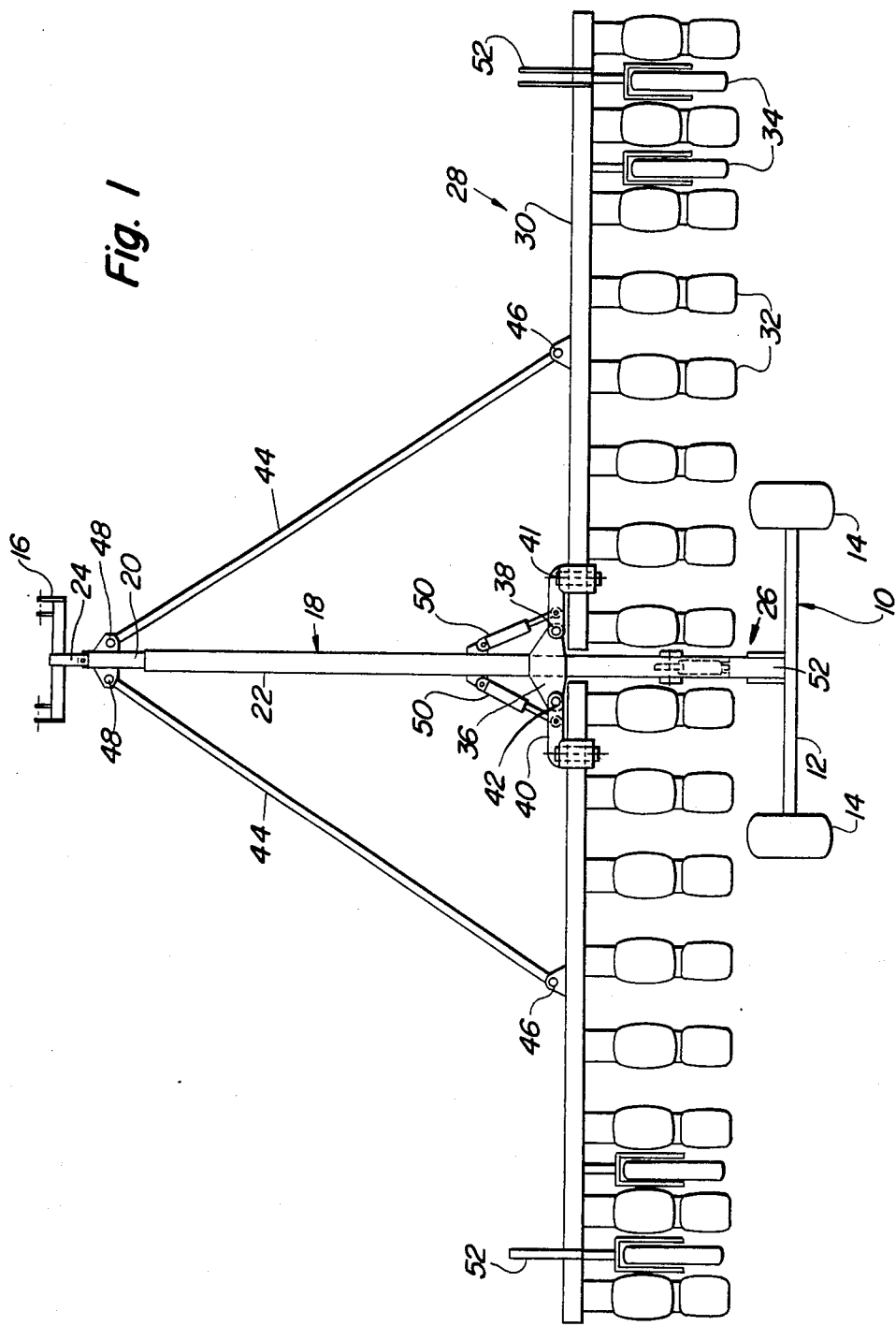
FIG. 1 is a plan view of the representative implement in working position.
Figure 2:
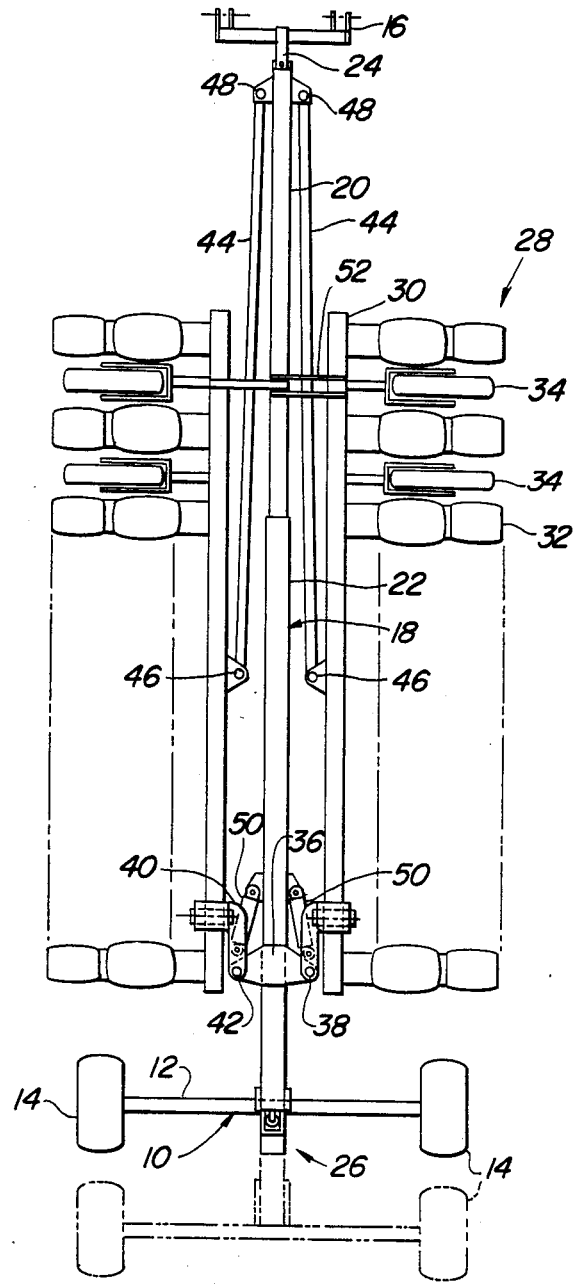
FIG. 2 is a plan of the implement as folded forwardly.

Since the basic elements of forwardly-folding toolbars and similar agricultural implements are well known, especially as exemplified in the above-noted Pratt patent, the present disclosure will be relatively brief and skeletal, consistent with the foregoing and with the nature of the present improvement. Typically, the implement comprises a rear center section or frame (10), preferably comprising a transverse axle (12) having ground-engaging wheels (14) at its opposite ends. A drawbar (16) represents a tractor for pulling the implement, as by means of an enlongated fore-and-aft hitch means (18), here of the telescopic type made up of front and rear parts or members (20) and (22). The front end of the front part is connected to the tractor drawbar at (24) and the rear part is connected to the midpoint of the rear section through the intermediary of an extensible and retractible means (26), to be described in detail later. Suffice it to say for the moment, that the rear section and hitch represent a multi-wheeled support for right and left implement wing sections (28), each of which may comprise a frame or toolbar (30) carrying a plurality of agricultural tools; e.g., planter row units (32).

Each wing section is shown as ground-supported at its outer end portion by a pair of wheels (34). A mounting bracket (36) is carried by the hitch means (18) in forwardly spaced relation to the rear section (10) and provides opposite vertical pivots (38) respectively for the inner end portions of the wing sections. As shown in FIG. 1, the wing sections are supported on their wheels (34) and on the hitch means and wheeled rear-section in an operating mode in which the wing sections are alined end-to-end in a transverse attitude forwardly of the rear section (10) and thus not in transverse alinement with that section. The inner ends of the wing sections are closely spaced apart, one on each side of the intervening hitch section, the spacing being the same as that involved in the row spacing between any included neighboring pair of row units (32). Thus, the row spacing across the machine is uniform and the wheeled rear section trails the end-to-end wing sections.

The connection of the inner end of each wing section to its pivot (38) is effected by an L-shaped member (40) of two-piece construction which provides a fore-and-aft pivot (41) about which the wing section may swing or float relative to the rest of the implement as the machine encounters uneven ground contour during its advance, another known characteristic of so-called wide implements.

The wing sections respectively have forwardly converging tow or brace bars (44) connected thereto at (46) and to the front part (20) of the hitch means at (48), a construction known from the Pratt patent. Also known from the Pratt patent is the use of power means, such as a pair of hydraulic motors (50), acting between the wing section L-members (40) and the rear part (22) of the hitch means, to effect folding and unfolding of the wing sections. As in the Pratt patent, forward folding involves retraction of the hydraulic motors and extension of the hitch means. As the wing sections move to and from their folded positions, they roll respectively on their wheels (34). When the wing sections are folded, the wheels (34) are raised clear of the ground, another practice that is conventional and thus is not shown in detail here. In folded position, the wing sections are locked together by cooperative latch means (52), known from the Pratt patent.

A further and more significant feature of the invention is the construction of the rear or center section (10).

Figure 3:
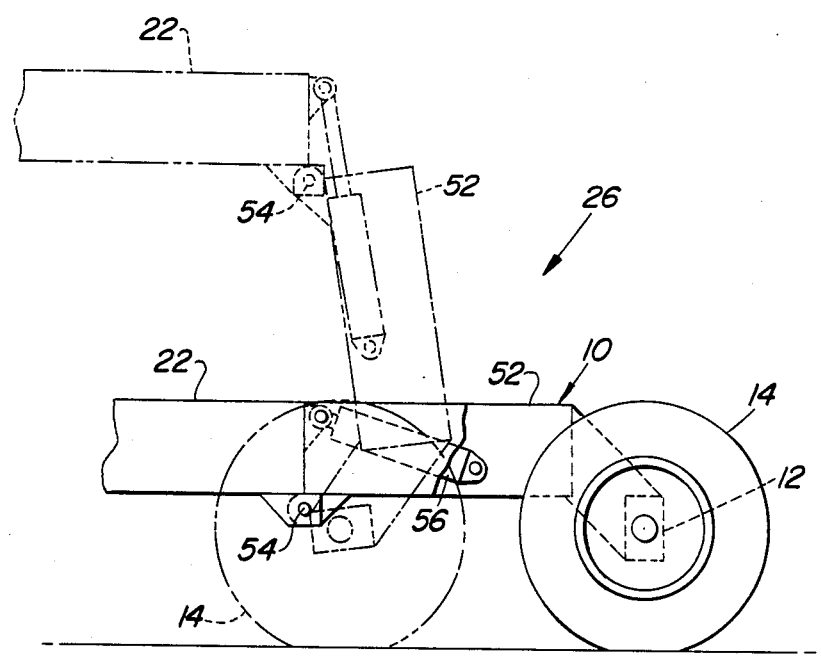
FIG. 3 is a fragmentary elevation of one form of mechanism that may be used to achieve selective variations in length of the hitch means.

This is best shown in FIG. 3, wherein it is seen that the extreme rear end of the rear part (22) comprises an extension member (52) pivoted to the part (22) on a transverse axis (54) that lies ahead of the wheels (14). Power-operated means of any type, such as a hydraulic motor (56), is connected between the part (22) and extension (52) so that, upon extension of the motor, the part (22) is elevated and the wheeled extension is rolled forwardly, which serves two purposes; namely, it shortens the over-all length of the machine in transport and brings the wheels (14) more closely beneath the weight of the elevated parts. Retraction of the motor of course reverses the foregoing to lower the unit to operating mode and to roll the wheels (14) rearwardly.

I claim:

1. A forwardly folding, tractor-drawn agricultural implement, comprising a rear frame disposed transversely and substantially centered on the line of advance of the implement and having ground-engaging rear support wheels thereon, a pair of outer wing sections disposed, in operating positions, respectively at opposite sides of the line of advance and in transverse alinement with each other and lying forwardly of the aforesaid wheels, additional wheels respectively carried by and supporting the wing sections and disposed forwardly of the rear support wheels in the operating positions of said sections, row spaced tools carried by the wing sections, and, in the operating positions of the wing sections, extending rearwardly from the respective sections and terminating ahead of the rear support wheels, a fore-and-aft telescopic hitch element centered on the line of advance and having a front end adapted for connection to a tractor and a rear end proximate to the rear frame, said hitch element being extended in the transport mode of the implement and shortened in the operating mode of the implement, means connecting the rear end of said element to the rear frame for relative fore-and-aft movement of the rear frame between a rearwardmost position when the implement is in operating mode and a forwardly disposed position when the implement is in its transport mode, means operative between the hitch element and the rear frame for selectively achieving said positions of the rear frame, and means operative between the hitch element and the wing sections for effecting folding of the wing sections forwardly respectively along opposite sides of the hitch element to achieve the transport positions of the wing sections.

* * * * *